Patented Dec. 6, 1932

1,889,961

UNITED STATES PATENT OFFICE

ALPHONS O. JAEGER, OF MOUNT LEBANON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PURIFICATION OF PHTHALIDE

No Drawing. Application filed November 10, 1930. Serial No. 494,813.

This invention relates to the purification of phthalide and derivatives.

Phthalide is obtained ordinarily either by the reduction of phthalic anhydride in liquid or vapor phase or by treatment of phthalimide with a reducing agent such as zinc and caustic soda. In both cases the raw material used need not be chemically pure, and particularly when catalytic air oxidation phthalic anhydride is used the difference in cost between a commercially pure phthalic anhydride and crude or even technical phthalic anhydride represents a very considerable differential in the final cost of phthalide. One of the main uses of phthalide is as a plasticizer for cellulose ester or other plastics, and for this use an odorless product is especially desirable. It is likewise desirable to have a colorless product. When, however, phthalide is produced by the reduction of impure catalytic air oxidation phthalic anhydride or of impure phthalimide, the product so obtained contains impurities which impart to it a considerable odor and in some cases it also contains certain colored impurities.

The present invention is directed to a simple, cheap and efficient means of purifying phthalide by removing the odor-forming and in some cases colored impurities. I have found that the impurities, particularly the odor-forming impurities, are volatile with steam at a temperature at which phthalide is practically non-volatile. It is, therefore, possible to remove substantially all of the odor-forming and colored impurities by a simple steam distillation of the crude phthalide product. In many cases the odor-forming impurities are quantitatively removed. The residue in the still is a purified phthalide which can be used directly as a plasticizer or for any other purpose for which a relatively pure, odorless phthalide is required.

The particular temperature at which the steam distillation takes place is not vital. It is possible to effect a very thorough purification with saturated steam at approximately atmospheric pressure, but a quicker and better purification can be obtained by using steam at a slightly higher pressure, for example at approximately 125 pounds. If desired, of course, superheated steam may be used. Of course steam of still higher pressure is effective, the limit of temperature being that at which phthalide begins to sublime over in substantial quantities. The invention, therefore, includes the use of steam at any pressure above or below atmospheric which is below that at which phthalide substantially sublimes over.

Phthalide melts at about 73° C. and is, therefore, maintained in a molten condition even when saturated steam at atmospheric pressure is used. The form of the still is that of the ordinary steam still, the process proceeding simply and smoothly and requiring no special equipment of any kind. This is one of the advantages of the present invention and still further reduces the cost of purifying phthalide. It is, of course, possible to use superheated steam with excellent results, but as saturated steam will give practically as good results it is ordinarily used as it is generally available at a lower cost than superheated steam. The invention, of course, is in no sense limited to the use of saturated steam, although this may be considered as the preferred modification as it makes it possible to use exhaust steam of varying pressures which are available in the ordinary chemical plant. Also, since the exact temperature of the steam is not of great importance so long as it is not too high to cause substantial losses of phthalide, no particular control of the exhaust steam pressure or temperature is required, giving an added flexibility to the process which renders it still more attractive for large scale production.

When phthalide is produced by the zinc or caustic soda reduction of phthalimide, it is of course present in the form of a suspension in a solution of sodium zincate. When subjected to steam distillation the resulting product, of course, contains sodium zincate, together with the phthalide, and it is an advantage that the hot solution thus obtained can be permitted to cool and the water-soluble components filtered off, leaving phthalide of a high purity. As the process applied either to phthalide from catalytic air-oxidation phthalic anhydride or phthalimide results in the production of a liquid product or a product which is easily maintained liquid by ordinary steam heat, the still can be charged and discharged very easily by suitably valved pipes, an added feature of economy in the present process.

For the most part, the impurities distilled off by steam are of little or no value and are ordinarily thrown away. If, however, impurities are present in sufficient quantities they may, of course, be recovered from the condensate of the steam distillation.

The present invention is also applicable to phthalide derivatives which contain the same or similar impurities; thus, for example, crude phthalide may be chlorinated or brominated. Insofar as these treatments do not render the odor-forming impurities non-volatile with steam, the present invention is applicable and such modified processes are included. Hydrogenated phthalides such as di-, tetra- or hexahydrophthalide can also be produced from impure phthalic anhydrides and can be purified by the present invention, care being taken, however, not to permit the temperature to rise to a sufficient point to effect substantial sublimation of the hydrogenated phthalides which in some cases have vapor pressures higher than that of unsubstituted phthalide.

What is claimed as new is:

1. A method of partially purifying an impure phthalide obtained by the reduction of a compound included in the group consisting of impure phthalic anhydride prepared by the catalytic air-oxidation of naphthalene, phthalimide obtained from impure phthalic anhydride prepared by the catalytic air-oxidation of naphthalene, which comprises subjecting the impure product to distillation with steam at a temperature below that at which substantial amounts of the phthalide sublime over.

2. A method of partially purifying an impure, unsubstituted phthalide obtained by the reduction of a compound included in the group consisting of impure phthalic anhydride prepared by the catalytic air-oxidation of naphthalene, phthalimide obtained from impure phthalic anhydride prepared by the catalytic air-oxidation of naphthalene, which comprises subjecting the impure product to distillation with steam at a temperature below that at which substantial amounts of the phthalide sublime over.

3. A process according to claim 1, in which the impure phthalide contains volatile odor-forming impurities.

4. A process according to claim 2, in which the impure unsubstituted phthalide contains volatile, odor-forming materials.

5. A process according to claim 2, in which the phthalide is obtained by the reduction of impure air-oxidation phthalic anhydride.

6. As a new product, partially purified phthalide obtained from the reduction of impure air-oxidation phthalic anhydride which has been subjected to distillation with steam at a temperature below that at which phthalide is volatile with steam, being characterized by a substantial freedom from odor-forming impurities but containing impurities present in impure air-oxidation phthalic anhydride which are not volatile with steam.

Signed at Pittsburgh, Pennsylvania, this 7th day of November, 1930.

ALPHONS O. JAEGER.